United States Patent
Valkaitis

(10) Patent No.: US 11,856,105 B1
(45) Date of Patent: *Dec. 26, 2023

(54) SECURE MULTI-FACTOR AUTHENTICATION SYSTEM INCLUDING IDENTITY VERIFICATION OF AN AUTHORIZED USER

(71) Applicant: UAB 360 IT, Vilnius (LT)

(72) Inventor: Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,390

(22) Filed: May 22, 2022

(51) Int. Cl.
*H04L 9/32* (2006.01)
*H04L 9/08* (2006.01)
*H04L 9/14* (2006.01)

(52) U.S. Cl.
CPC .......... *H04L 9/3231* (2013.01); *H04L 9/0894* (2013.01); *H04L 9/14* (2013.01)

(58) Field of Classification Search
CPC ........ H04L 9/3231; H04L 9/0894; H04L 9/14
USPC ...................................................... 713/171
See application file for complete search history.

(56) References Cited

U.S. PATENT DOCUMENTS

| | | | |
|---|---|---|---|
| 10,904,234 B2 * | 1/2021 | Ross | H04L 63/0442 |
| 2016/0050213 A1 * | 2/2016 | Storr | H04L 9/32 726/6 |
| 2019/0318102 A1 * | 10/2019 | Araya | H04L 9/0891 |
| 2020/0320489 A1 * | 10/2020 | Vagare | G06Q 20/06 |
| 2020/0374273 A1 * | 11/2020 | Jones | G06F 16/258 |
| 2021/0157747 A1 * | 5/2021 | Shin | G06F 21/79 |
| 2022/0060317 A1 * | 2/2022 | Ponnuswamy | H04L 9/0631 |
| 2022/0108312 A1 * | 4/2022 | Makrides | G06Q 20/40145 |
| 2022/0114245 A1 * | 4/2022 | Krishan | G06F 21/32 |

* cited by examiner

*Primary Examiner* — Moeen Khan
(74) *Attorney, Agent, or Firm* — The Pattani Law Group

(57) ABSTRACT

A method including transmitting, based on verifying first biometric information, a first decryption request including an encrypted first cryptographic key in association with a first identifier to indicate that the encrypted first cryptographic key is to be decrypted by utilizing a first master key; decrypting, based on receiving a decrypted first cryptographic key, first factor authentication information to enable determination of a first factor; transmitting the first factor for authentication; transmitting, based on successful authentication of the first factor and on verifying second biometric information, a second decryption request including an encrypted second cryptographic key in association with a second identifier to indicate that the encrypted second cryptographic key is to be decrypted by utilizing a second master key; decrypting, based on receiving a decrypted second cryptographic key, second factor authentication information to enable determination of a second factor; and transmitting the second factor for authentication.

20 Claims, 6 Drawing Sheets

SECURE MULTI-FACTOR AUTHENTICATION SYSTEM INCLUDING IDENTITY VERIFICATION OF AN AUTHORIZED USER

FIELD OF DISCLOSURE

Aspects of the present disclosure generally relate to use of computer hardware and/or software for communications, and in particular to providing a secure authentication system.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method including transmitting, based on verifying first biometric information, a first decryption request including an encrypted first cryptographic key in association with a first identifier to indicate that the encrypted first cryptographic key is to be decrypted by utilizing a first master key; decrypting, based on receiving a decrypted first cryptographic key, first factor authentication information to enable determination of a first factor; transmitting the first factor for authentication; transmitting, based on successful authentication of the first factor and on verifying second biometric information, a second decryption request including an encrypted second cryptographic key in association with a second identifier to indicate that the encrypted second cryptographic key is to be decrypted by utilizing a second master key; decrypting, based on receiving a decrypted second cryptographic key, second factor authentication information to enable determination of a second factor; and transmitting the second factor for authentication.

In another aspect, the present disclosure contemplates a device comprising a memory and a processor communicatively coupled to the memory, the processor being configured to: transmit, based at least in part on verifying first biometric information, a first decryption request including an encrypted first cryptographic key in association with a first identifier to indicate that the encrypted first cryptographic key is to be decrypted based at least in part on utilizing a first master key identified by the first identifier; decrypt, based at least in part on receiving a decrypted first cryptographic key, first factor authentication information to enable determination of a first factor; transmit the first factor for authentication of the first factor; transmit, based at least in part on successful authentication of the first factor and on verifying second biometric information, a second decryption request including an encrypted second cryptographic key in association with a second identifier to indicate that the encrypted second cryptographic key is to be decrypted based at least in part on utilizing a second master key identified by the second identifier; decrypt, by the processor based at least in part on receiving a decrypted second cryptographic key, second factor authentication information to enable determination of a second factor; and transmit the second factor for authentication of the second factor.

In another aspect, the present disclosure contemplates a non-transitory computer readable medium storing instructions, which when executed by a processor cause the processor to: transmit, based at least in part on verifying first biometric information, a first decryption request including an encrypted first cryptographic key in association with a first identifier to indicate that the encrypted first cryptographic key is to be decrypted based at least in part on utilizing a first master key identified by the first identifier; decrypt, based at least in part on receiving a decrypted first cryptographic key, first factor authentication information to enable determination of a first factor; transmit the first factor for authentication of the first factor; transmit, based at least in part on successful authentication of the first factor and on verifying second biometric information, a second decryption request including an encrypted second cryptographic key in association with a second identifier to indicate that the encrypted second cryptographic key is to be decrypted based at least in part on utilizing a second master key identified by the second identifier; decrypt, by the processor based at least in part on receiving a decrypted second cryptographic key, second factor authentication information to enable determination of a second factor; and transmit the second factor for authentication of the second factor.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
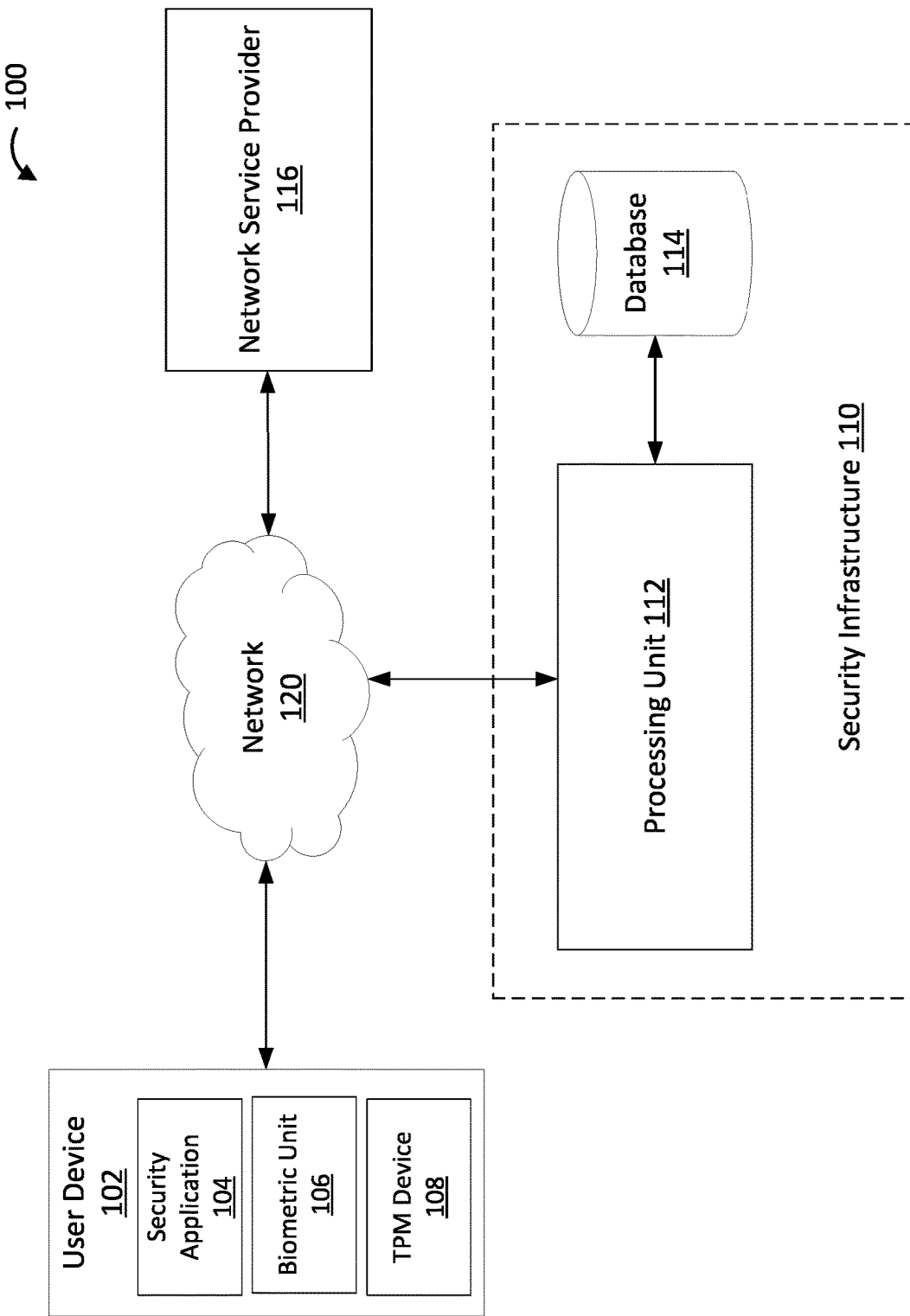

FIG. 1 is an illustration of an example system associated with a secure authentication system, according to various aspects of the present disclosure.

Figure 2:
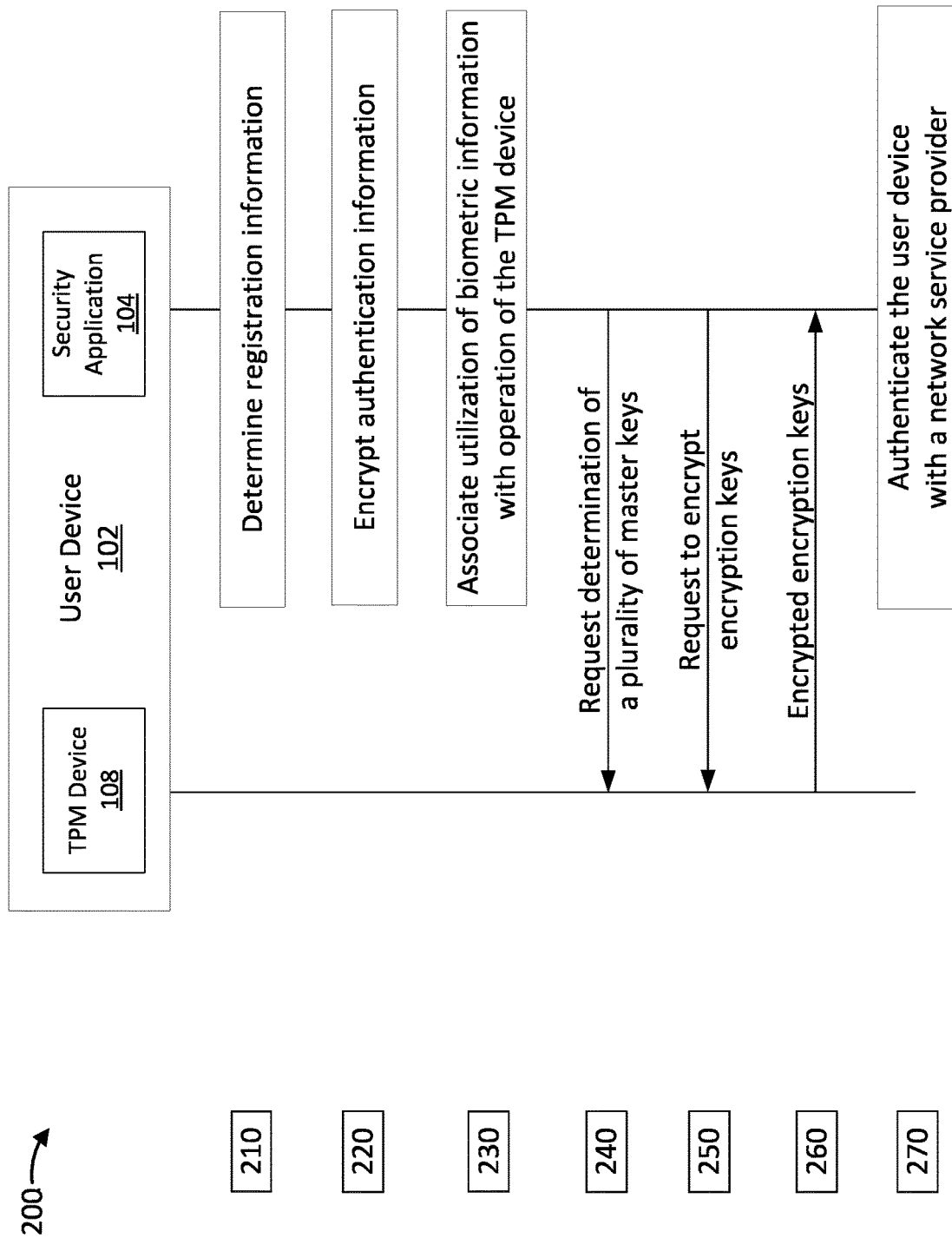

FIG. 2 is an illustration of an example flow associated with a secure authentication system, according to various aspects of the present disclosure.

Figure 3:
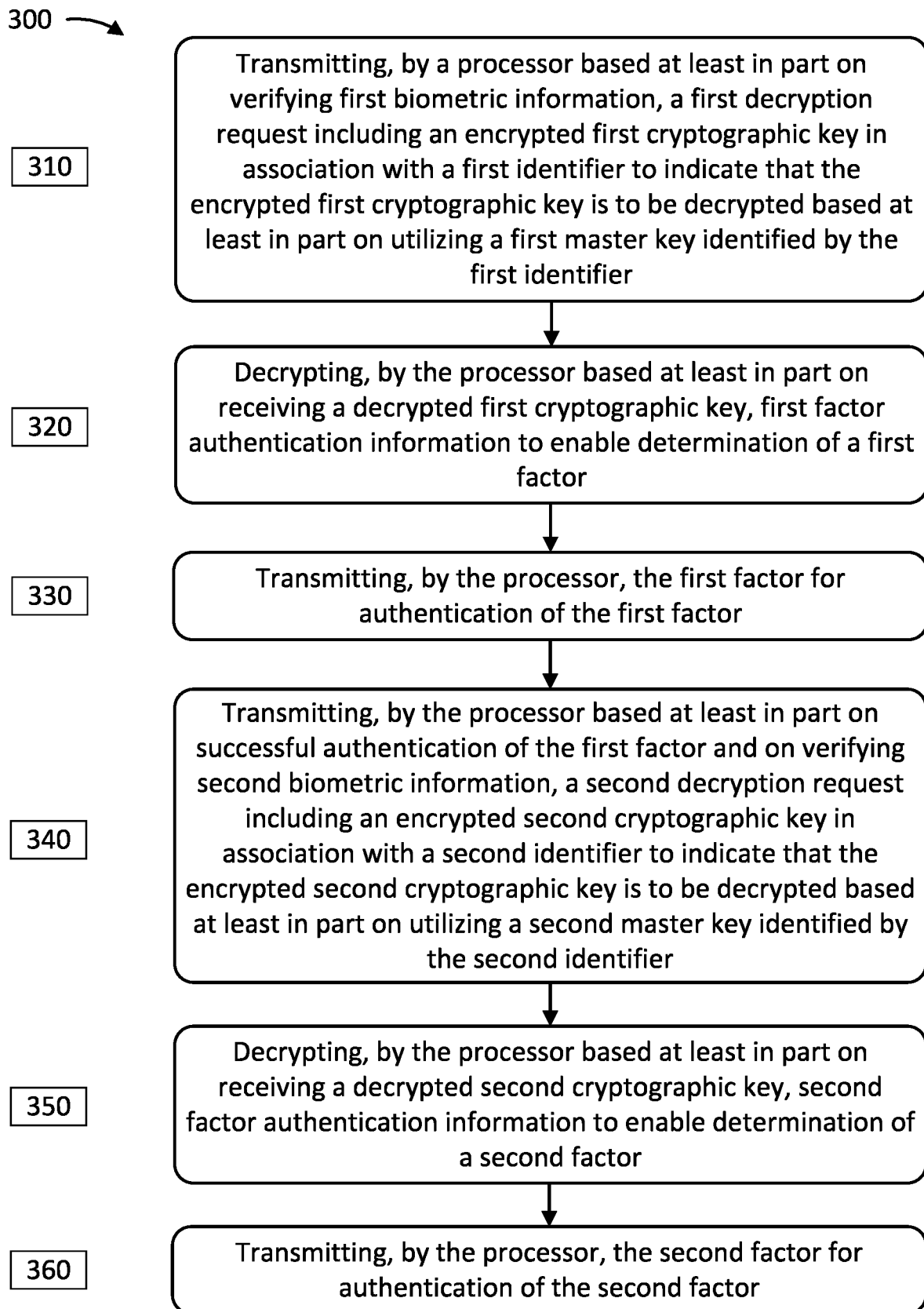

FIG. 3 is an illustration of an example process associated with a secure authentication system, according to various aspects of the present disclosure.

Figure 4:
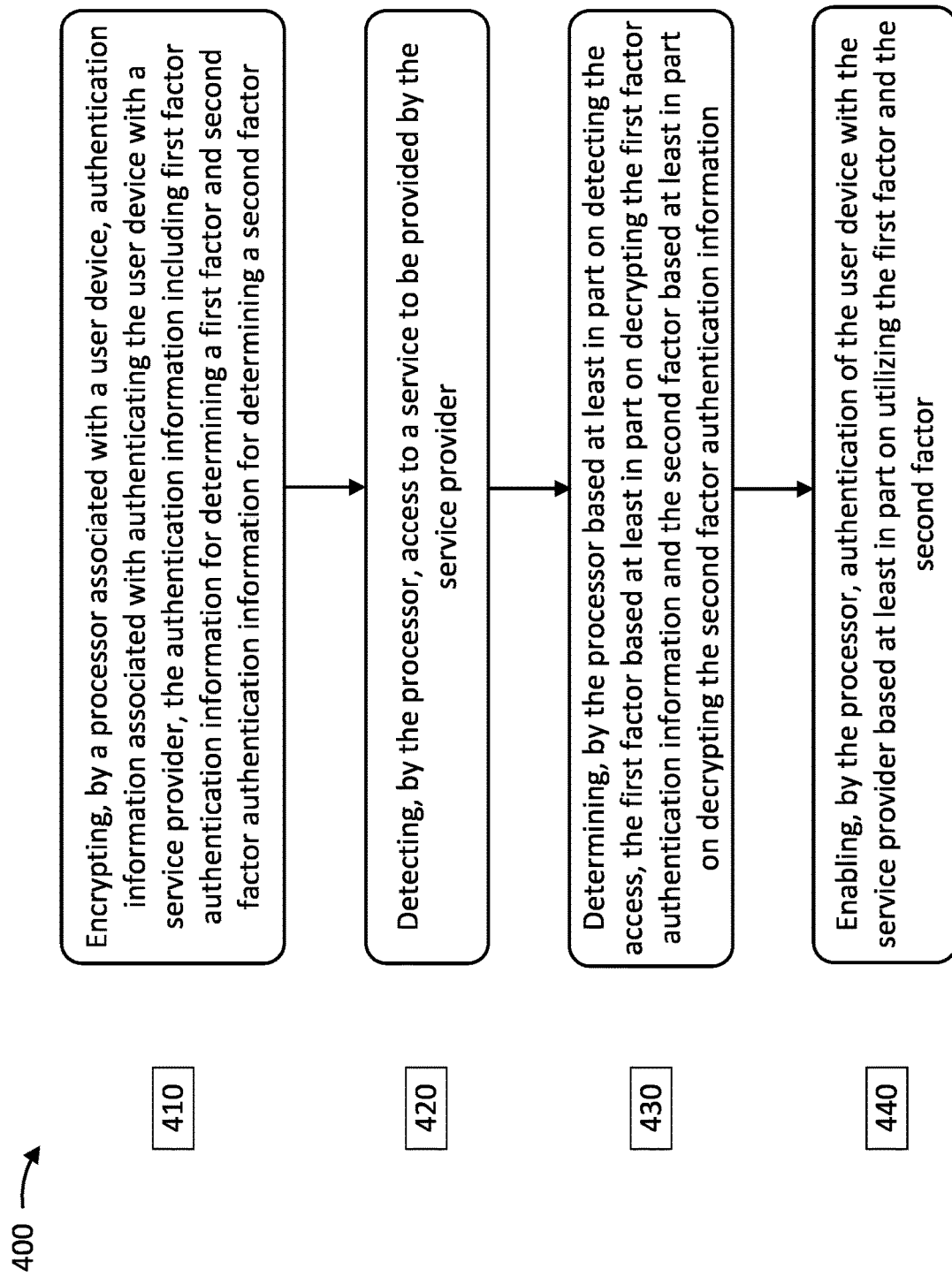

FIG. 4 is an illustration of an example process associated with a secure authentication system, according to various aspects of the present disclosure.

Figure 5:
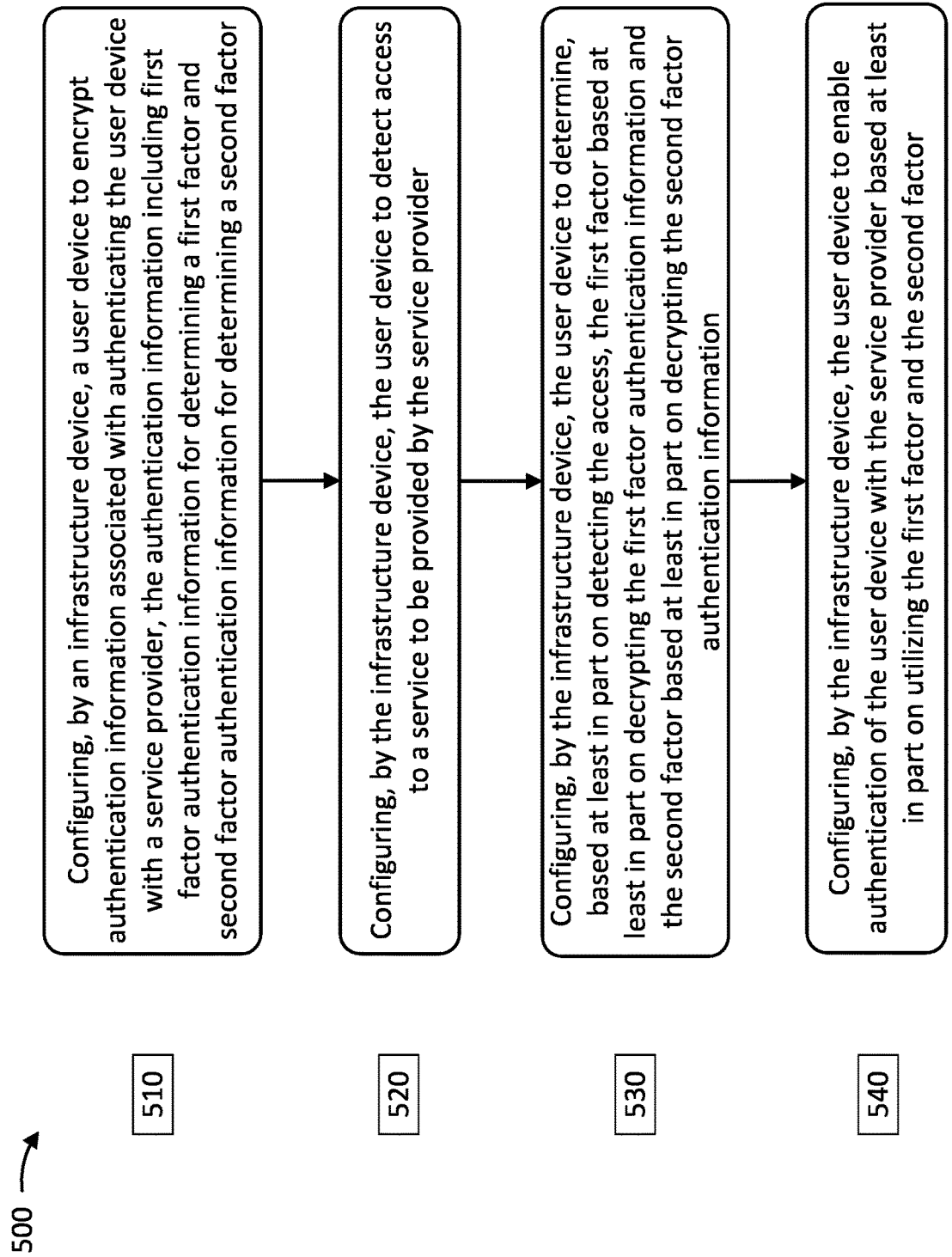

FIG. 5 is an illustration of an example process associated with a secure authentication system, according to various aspects of the present disclosure.

Figure 6:
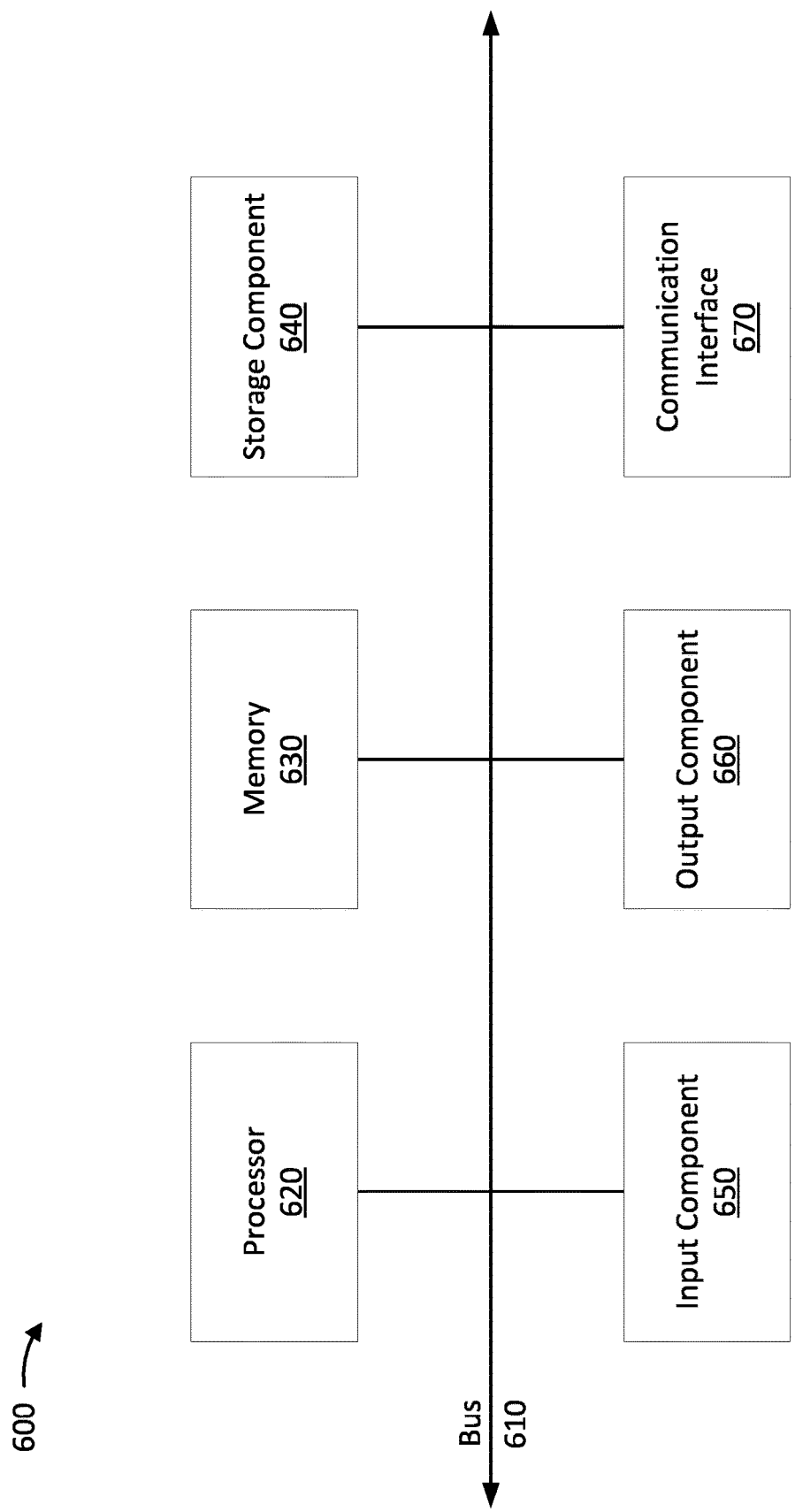

FIG. 6 is an illustration of example devices associated with a secure authentication system, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with a secure authentication system, according to various aspects of the present disclosure. The system 100 includes a user device 102, a security infrastructure 110, and a network service provider 116 communicating with each other over a network 120. In some aspects, the user device 102 and the network service provider 116 may communicate with one another for purposes of obtaining and/or providing network services. The network services may include any service provided over a network (e.g., Internet) such as, for example, electronic mail services, social media services, messaging services, virtual private network (VPN) services, data storage and protection services, financial services, e-commerce services, or a combination thereof. In some aspects, the user device 102 and the security infrastructure 110 may communicate with one another for purposes of obtaining and/or providing cyber security services. The cyber security services may include, for example, an authentication service during which the security infrastructure 110 enables secure authentication of the user device 102 with the network service provider 116.

The user device 102 may include and/or be associated with a security application 104, a biometric unit 106, and a trusted platform module (TPM) device 108 communicatively coupled to an associated processor (e.g., processor 620) and/or memory (e.g., memory 630). In some aspects, the associated processor and/or memory may be local to the user device 102. In some aspects, the associated processor and/or memory may be located remotely with respect to the user device 102. The security infrastructure 110 may include a processing unit 112 and a database (e.g., memory) 114. The security infrastructure 110 may provide the security application 104 for installation to enable the user device 102 to communicate with an application programming interface (API) (not shown) included in the security infrastructure 110 and/or for obtaining the cyber security services.

The user device 102 may be a physical computing device capable of hosting the security application 104 and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the security infrastructure 110 may configure and provide the user device 102 with the security application 104 to be installed on the user device 102. As discussed below in further detail with respect to FIG. 2, the security application 104 may be configured to enable utilization of the biometric unit 106 and/or the TPM device 108 by (an operating system of) the user device 102 to enable secure authentication of the user device 102 with the network service provider 116. Further, the security application 104 and/or the security infrastructure 110 may utilize one or more encryption and decryption algorithms to encrypt and decrypt the data. The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of encryption algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

The biometric unit 106 may enable identification, authentication, and/or access control. In some aspects, the biometric unit 106 may include a biometric sensor for sensing and/or capturing biometric information associated with a user. Such biometric information may include, for example, fingerprint, palm print, finger shape, palm shape, voice, retina, iris, face image, sound, dynamic signature, blood vessel pattern, keystroke, or a combination thereof. The biometric unit 106 may utilize the associated processor to correlate the captured biometric information with user information, and to store a correlation of the biometric information with the user information in the associated memory. Further, the biometric unit 106 may enable comparison of a received biometric information with stored biometric information to verify and/or authenticate that the received biometric information is associated with the user information (e.g., belongs to the user).

The TPM device 108 may include a dedicated controller utilizing integrated cryptographic keys (e.g., master keys) and/or cryptographic algorithms to operate as a secure crypto processor. The TPM device 108 may carry out cryptographic operations, embedded in a packaging with multiple physical security measures, which give it a degree of tamper resistance. In some aspects, the TPM device 108 may refrain from communicating the cryptographic keys (e.g., master keys, etc.) and/or the cryptographic algorithms externally (e.g., external to the TPM device 108).

The security infrastructure 110 may include the processing unit 112 and the database 114. The processing unit 112 may include a logical component configured to perform complex operations to evaluate various factors associated with providing the cyber security services. The database 114 may store various pieces of information associated with providing the cyber security services, including security algorithms, encrypted content, and/or encryption/decryption key information. The security infrastructure 110 may include or be associated with a communication interface (e.g., communication interface 670) to communicate (e.g., transmit and/or receive) data.

The network service provider 116 may own and operate an infrastructure associated with providing the network services. To access the network services, the network service provider 116 may enable the user device 120 to set up an authentication system. Upon communication of credentials by the user device 102, the network service provider 116 may authenticate the credentials and provide the user device 102 with access to the network services when the credentials are successfully authenticated.

The network 120 may be wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

As indicated above, FIG. 1 is provided as an example. Other examples may differ from what is described with regard to FIG. 1.

A user device may register an account with a network service provider to receive network services. The network services may include a service provided over a network (e.g., Internet) such as, for example, electronic mail services, social media services, messaging services, virtual private network (VPN) services, data storage and protection services, or a combination thereof. To gain access to the network services, the user device may set up an authentication system with the network service provider.

Traditionally, the authentication system may include a single-factor authentication system or a multi-factor authentication system. In the single-factor authentication system, the user device may communicate a first factor such as, for example, a username and/or a password for authentication by the network service provider. Upon successful authentication of the first factor, the network service provider may provide the user device with the network services. In multi-factor authentication, upon successful authentication of the first factor, the user device may determine and communicate a second factor (e.g., pin, token, alphanumeric string, or a combination thereof) for further authentication by the network service provider. The second factor may be different and/or independent from the first factor. Based at least in part on successful authentication of the second factor, the network service provider may provide the user device with access to the network services.

To determine the second factor, the network service provider may provide the user device with secret information (e.g., seed information, QR code, etc.) associated with the user device and/or the registered account. The user device may utilize the secret information to determine the second factor. In an example, the user device may install an authentication application, which may utilize the secret information to determine the second factor. The user device may communicate the determined second factor to the network service provider for the further authentication.

The multi-factor authentication system may be unsecure because it utilizes identity assumption rather than identity authentication. For instance, the multi-factor authentication system authenticates the user device under an assumption that the user device is being operated by an authorized user. However, the multi-factor authentication system fails to authenticate the identity of the authorized user while performing the authentication. This may result in private information (e.g., a location of the user device, account information, identity and/or contact information associated with the authorized user, a nature of the network services received, etc.) becoming compromised (e.g., identified and collected) when, for example, a malicious party gains unauthorized access to the user device. The network service provider and/or the user device may expend various resources (e.g., management resources, network resources, financial resources, processing resources, memory resources, power consumption resources, battery life, or the like) in efforts to mitigate effects of the private information becoming compromised.

Further, utilization of the authentication application to determine the second factor may be inconvenient for several reasons. In an example, the authorized user may have to inefficiently switch between applications and/or between devices (when the network devices are to be received at a device other than the user device) to determine and communicate the second factor.

Various aspects of systems and techniques discussed in the present disclosure provide a secure authentication system. The secure authentication system may include a security infrastructure and/or a security application that is installed on a user device. In some aspects, the security infrastructure may provide the user device with the security application. The security application may be configured to enable utilization of a biometric unit and/or a TPM device by (an operating system of) the user device to enable secure authentication of the user device with, for example, a network service provider that provides network services to the user device. Based at least in part on utilization of the biometric unit and/or the TPM device during authentication, the security application may enable identity authentication (e.g., authentication of identity of an authorized user during authentication), thereby securing the authentication process and preventing private information from becoming compromised. As a result, the security application may enable efficient utilization of resources (e.g., management resources, network resources, financial resources, processing resources, memory resources, power consumption resources, battery life, or the like) by the user device and/or the network service provider. Additionally, the security application may reduce inconvenience associated with the authorized user switching between applications and/or between devices.

In some aspects, a processor executing the security application may transmit, based at least in part on verifying first biometric information, a first decryption request including an encrypted first cryptographic key in association with a first identifier to indicate that the encrypted first cryptographic key is to be decrypted based at least in part on utilizing a first master key identified by the first identifier; decrypt, based at least in part on receiving a decrypted first cryptographic key, first factor authentication information to enable determination of a first factor; transmit the first factor for authentication of the first factor; transmit, based at least in part on successful authentication of the first factor and on verifying second biometric information, a second decryption request including an encrypted second cryptographic key in association with a second identifier to indicate that the encrypted second cryptographic key is to be decrypted based at least in part on utilizing a second master key identified by the second identifier; decrypt, by the processor based at least in part on receiving a decrypted second cryptographic key, second factor authentication information to enable determination of a second factor; and transmit the second factor for authentication of the second factor.

FIG. 2 is an illustration of an example flow 200 associated with a secure authentication system, according to various aspects of the present disclosure. The example flow 200 may include a user device 102 obtaining cyber security services from a security infrastructure (e.g., security infrastructure 110). As discussed above with respect to FIG. 1, the user device 102 may include a security application 104, a biometric unit 106 (not shown), and a TPM device 108. In some aspects, the security infrastructure 110 may configure and provide the security application 104 to enable the user device 102 to authenticate the user device 102 with a network service provider (e.g., network service provider 116).

The user device 102 may receive network services from the network service provider 116. The network services may include a service provided over a network (e.g., Internet) such as, for example, electronic mail services, social media services, messaging services, virtual private network (VPN) services, data storage and protection services, or a combination thereof. To gain access to the network services, the user device 102 may set up an authentication system with the network service provider 116.

The authentication system may include a multi-factor authentication system. To receive the network services, the user device 102 may utilize a web browser and/or a network service provider (NSP) application to communicate a first factor such as, for example, a username and/or a password for authentication by the network service provider 116. Based at least in part on successful authentication of the first factor, the user device 102 may determine and communicate a second factor (e.g., pin, token, alphanumeric string, or a combination thereof) for further authentication by the network service provider 116. The second factor may be different and/or independent from the first factor. In some aspects, the second factor may be a variable factor, varying based at least in part on a time reference (e.g., Unix time). Based at least in part on successful authentication of the second factor, the network service provider 116 may provide the user device 102 with the network services.

The security application 104 may enable the user device 102 to receive information to be processed by the security application 104 and/or by the security infrastructure 110. The security application 104 may include a graphical interface to receive the information via a local input interface (e.g., touch screen, keyboard, mouse, pointer, camera, etc.) associated with the user device 102. The information may be received via text input or via a selection from among a plurality of options (e.g., pull down menu, etc.). In some aspects, the security application 104 may activate and/or enable, at a time associated with receiving the information, the graphical interface to receive the information. For instance, the security application 104 may cause a screen (e.g., local screen) associated with the user device 102 to display, for example, a pop-up message to request entry of the information. The security application 104 may also enable transmission of at least a portion of the information to the security infrastructure 110.

As shown by reference numeral 210, the security application 104 may determine registration information. In some aspects, the security application 104 may enable secure authentication of the user device 102 by the network service provider 116. To do so, the security application 104 may determine the registration information, which includes, for example, metadata associated with the network services to be received from the network service provider 116 and/or credential data associated with authenticating the user device 102 with the network service provider 116. In some aspects, the security application 104 may determine the registration information based at least in part on requesting and receiving entry of the registration information and/or via requesting and receiving access to a registered account associated with the network service provider 116.

In some aspects, the metadata may include, for example, information regarding the network service provider 116, communication information (e.g., domain information, IP address, or the like) associated with communicating with the network service provider 116, subscription information associated with the network services to be received, or the like. In some aspects, the credential data may include private information including, for example, account information, payment information, first factor authentication information, second factor authentication information, or the like.

The first factor authentication information may include, for example, information associated with determining a first factor such as, for example, a username and/or a password associated with authenticating the user device 102 with the network service provider 116. In an example, the first factor authentication information may include, for example, a hint, a question, and/or a string of alphanumeric characters to enable the security application 104 to determine the username and/or password in real time (e.g., during authentication of the user device with the network service provider 116). The second factor authentication information may include, for example, secret information associated with determining the second factor (e.g., one-time password, one-time pin, one-time token, or the like). In some aspects, based at least in part on utilizing the secret information in association with, for example, a security algorithm, the security application 104 may determine the second factor in real time (e.g., during authentication of the user device with the network service provider 116). In example, the security algorithm may include a one-time password algorithm, a time-based one-time password algorithm, or the like.

Additionally, the registration information may include other information such as, for example, identity of an owner of the user device 102, a phone number associated with the user device 102, an email address associated with the user device 102, or a combination thereof.

As shown by reference numeral 220, the security application 104 may encrypt authentication information. In some aspects, the security application 104 may determine a first cryptographic key and may encrypt the first factor authentication information based at least in part on utilizing the first cryptographic key. Further, the security application 104 may determine a second cryptographic key and may encrypt the second factor authentication information (e.g., secret information) based at least in part on utilizing the second cryptographic key. Furthermore, the security application 104 may determine a third cryptographic key and may encrypt the metadata based at least in part on utilizing the third cryptographic key. In some aspects, the first cryptographic key, the second cryptographic key, and/or the third cryptographic key may include respective symmetric cryptographic keys.

The security application 104 may store the encryption information including, for example, encrypted first factor authentication information, encrypted second factor authentication information, and/or encrypted metadata in a memory (e.g., memory 630) associated with the user device 102 and/or in a memory (e.g., database 114) associated with the security infrastructure 110.

As shown by reference numeral 230, the security application 104 may utilize an operating system being utilized by the user device 102 to associate verification and/or authentication of biometric information with operation of the TPM device 108. In some aspects, the security application 104 may determine availability of the biometric unit 106 and of the TPM device 108. To determine availability of the biometric unit 106 and of the TPM device 108, the security application 104 may request and receive, from the operating system, information indicating that the biometric unit 106 and of the TPM device 108 are associated with the operating system.

Based at least in part on determining availability of the biometric unit 106 and of the TPM device 108, the security application 104 may enable utilization of the biometric unit 106 and/or the TPM device 108 to enable authentication of the user device 102 with the network service provider 116. In an example, the security application 104 may utilize the operating system to associate verification and/or authentication of biometric information with operation of the TPM device 108. In an example, the security application 104 may associate verification and/or authentication of biometric information with encrypting of data by the TPM device 108 and/or with decrypting of data by the TPM device 108. The associating of verification and/or authentication of biometric information with operation of the TPM device 108 may be such that a request for the TPM device 108 to encrypt data and/or decrypt data is to indicate a result of verification and/or authentication of biometric information.

To associate verification and/or authentication of biometric information with operation of the TPM device 108, the security application 104 may, for example, display a pop-up message on a screen associated with the user device 102 to request biometric information from an authorized user of the user device 102. Further, the security application 104 may enable (e.g., cause) the operating system to activate the biometric unit 106 to sense the biometric information. The security application 104 may receive and store, in an associated memory, the biometric information that belongs to the authorized user as authentic biometric information.

When the security application 104 is to transmit a request for the TPM device 108 to encrypt data and/or decrypt data, the security application 104 may verify and/or authenticate biometric information in real time. In an example, to verify and/or authenticate the biometric information, the security application 104 may enable (e.g., cause) the operating system to activate the biometric unit 106 to receive biometric information in real time (e.g., at a time associated with transmitting the request). Further, the security application 104 may compare the received biometric information with the authentic biometric information stored in the associated memory. When the received biometric information matches (e.g., is the same as) the stored authentic biometric information (e.g., successful authentication), the security application 104 may determine that the received biometric information belongs to the authorized user and may select to transmit the request for the TPM device to encrypt data and/or decrypt data. In some aspects, the request may include and/or indicate a result of the received biometric information matching the authentic biometric information to the TPM device 108. Alternatively, when the received biometric information fails to match (e.g., is different from) the stored authentic biometric information (e.g., unsuccessful authentication), the security application 104 may determine that the received biometric information does not belong to the authorized user and may select to refrain from transmitting the request for the TPM device to encrypt data and/or decrypt data.

As shown by reference numeral 240, the security application 104 may request the TPM device 108 to determine master keys. The master keys may be associated with encryption and decryption of cryptographic keys utilized to encrypt the first factor authentication information, the second factor authentication information, and/or the metadata. In some aspects, the master keys may include respective symmetric master keys. In some aspects, the master keys may include respective asymmetric master key pairs, each including a master public key and a master private key. The master public key and the master private key may be associated with each other via, for example, a mathematical function. As a result, data encrypted using the master public key may be decrypted by utilizing the master private key. In some aspects, the TPM device 108 may retain possession of the master keys (e.g., the TPM device 108 may keep the master keys confidential).

Based at least in part on determining the master keys, the TPM device 108 may return unique identifiers associated with (e.g., that identify) the master keys to the security application 104. In an example, the TPM device 108 may return a first unique identifier associated with a first master key and may return a second unique identifier associated with a second master key. In some aspects, the master keys and/or the unique identifiers may be specific to (e.g., may be utilized by) the user device 102.

As shown by reference numeral 250, the security application 104 may transmit to the TPM device 108 encryption requests to encrypt the cryptographic keys. In some aspects, the encryption requests may include a first encryption request to encrypt the first cryptographic key and/or the third cryptographic key based at least in part on utilizing the first master key. The first encryption request may include the first unique identifier in association with the first cryptographic key and/or the third cryptographic key to indicate to the TPM device 108 that the first cryptographic key and/or the third cryptographic key is to be encrypted based at least in part on utilizing the first master key that is associated with (e.g., identified by) the first unique identifier.

The first encryption request may also include and/or indicate a result of the security application 104 verifying and authenticating biometric information. In an example, the security application 104 may receive and verify/authenticate biometric information in real time (e.g., while transmitting the encryption request), as discussed elsewhere herein. When the received biometric information matches the stored authentic biometric information, the security application 104 may determine that the received biometric information belongs to the authorized user and may select to transmit the first encryption request. Further, the first encryption request may include and/or indicate the result of the successful verification and/or authentication.

Based at least in part on receiving the first encryption request, the TPM device 108 may determine, from the included and/or indicated result of the successful verification and/or authentication, that the received biometric information matches the stored authentic biometric information. Further, the TPM device 108 may determine that the first cryptographic key and/or the third cryptographic key are to be encrypted using the first master key associated with the first unique identifier, as indicated by the first encryption request. As a result, the TPM device 108 may encrypt the first cryptographic key and/or the third cryptographic key. In some aspects, the first cryptographic key may be encrypted separately from the third cryptographic key.

When the first master key includes a first symmetric master key, the TPM device 108 may utilize the first symmetric master key to encrypt the first cryptographic key and/or the third cryptographic key. When the first master key includes a first master key pair, the TPM device 108 may utilize the first master public key to encrypt the first cryptographic key and the third cryptographic key. In some aspects, as shown by reference numeral 260, the TPM device 108 may provide the encrypted first cryptographic key and/or the third cryptographic key to the security application 104.

Similarly, the requests may include a second encryption request to encrypt the second cryptographic key based at least in part on utilizing the second master key. The second encryption request may include the second unique identifier in association with the second cryptographic key to indicate to the TPM device 108 that the second cryptographic key is to be encrypted based at least in part on utilizing the second master key that is associated with (e.g., identified by) the second unique identifier.

The second encryption request may also include and/or indicate a result of the security application 104 verifying and authenticating biometric information. In an example, the security application 104 may receive and verify/authenticate biometric information in real time (e.g., while transmitting the encryption request), as discussed elsewhere herein. When the received biometric information matches the stored authentic biometric information, the security application 104 may determine that the received biometric information belongs to the authorized user and may select to transmit the second encryption request. Further, the second encryption request may include and/or indicate the result of the successful verification and/or authentication.

Based at least in part on receiving the second encryption request, the TPM device 108 may determine, from the included and/or indicated result of the successful verification and/or authentication, that the received biometric information matches the stored authentic biometric information. Further, the TPM device 108 may determine that the second cryptographic key is to be encrypted using the second master key associated with the second unique identifier, as indicated by the second encryption request. As a result, the TPM device 108 may encrypt the second cryptographic key.

When the second master key includes a second symmetric master key, the TPM device 108 may utilize the second symmetric master key to encrypt the second cryptographic key. When the second master key includes a second master key pair, the TPM device 108 may utilize a second master public key to encrypt the second cryptographic key. In some aspects, as shown by reference numeral 260, the TPM device 108 may provide the encrypted second cryptographic key to the security application 104.

As shown by reference numeral 270, when the user device 102 is to receive the network services from the network service provider 116, the security application 104 may authenticate the user device 102 with the network service provider 116. In some aspects, the security application 104 may detect an attempt by the user device 102 to access the network services. In some aspects, detecting the attempt to access the network services may include detecting transmission of data (e.g., request for services) to a network address (e.g., IP address) associated with the network service provider 116. To detect the attempt to access, the security application may compare network addresses accessed by an application installed on the user device 102 with the communication information associated with the network service provider.

In an example, the security application 104 may request for and may receive an indication from the operating system that an application on the user device 102 has transmitted the data (e.g., request for services) to a network address (e.g., IP address) associated with the network service provider 116. In another example, the security infrastructure 110 may provide, in association with the security application 104, an extension application that the user device 102 may install in, for example, a web browser to be utilized for receiving the network services. In some aspects, the user device 102 may install the extension application in association with a network service provider (NSP) application to be utilized for receiving the network services. When the user device 102 executes the web browser and/or the NSP application to communicate with the network service provider 116 (e.g., transmits data to the network address), the extension application transmits a message to the security application 104, the message indicating that authentication of the user device 102 with the network service provider 116 is to be performed. In some aspects, the authorized user may execute the security application 104 to perform the authentication of the user device 102 with the network service provider 116.

To authenticate the user device 102, the security application 104 may retrieve the encrypted first cryptographic key and/or the encrypted second cryptographic key and/or the encrypted third cryptographic key from the memory associated with the user device 102. Further, the security application 104 may transmit to the TPM device 108 decryption requests to decrypt the encrypted cryptographic keys. In some aspects, the decryption requests may include a first decryption request to decrypt the encrypted first cryptographic key and/or the encrypted third cryptographic key based at least in part on utilizing the first master key. The first decryption request may include the first unique identifier in association with the encrypted first cryptographic key and/or the encrypted third cryptographic key to indicate to the TPM device 108 that the encrypted first cryptographic key and/or the encrypted third cryptographic key is to be decrypted based at least in part on utilizing the first master key that is associated with (e.g., identified by) the first unique identifier. In some aspects, the encrypted first cryptographic key may be decrypted separately from the encrypted third cryptographic key.

The first decryption request may also include a result of the security application 104 verifying and authenticating biometric information. In an example, the security application 104 may receive and verify/authenticate biometric information in real time (e.g., while transmitting the first decryption request), as discussed elsewhere herein. When the received biometric information matches the stored authentic biometric information, the security application 104 may determine that the received biometric information belongs to the authorized user and may select to transmit the first decryption request. Further, the first decryption request may include and/or indicate the result of the successful verification and/or authentication.

Based at least in part on receiving the first decryption request, the TPM device 108 may determine, from the included and/or indicated result of the verification and/or authentication, that the received biometric information matches the stored authentic biometric information. Further, the TPM device 108 may determine that the encrypted first cryptographic key and/or the encrypted third cryptographic key is to be decrypted using the first master key associated with the first unique identifier, as indicated by the first decryption request. As a result, the TPM device 108 may decrypt the encrypted first cryptographic key and/or the encrypted third cryptographic key.

When the first master key includes a first symmetric master key, the TPM device 108 may utilize the first symmetric master key to decrypt the encrypted first cryptographic key and/or the encrypted third cryptographic key. When the first master key includes a first master key pair, the TPM device 108 may utilize the first master private key to decrypt the encrypted first cryptographic key and the encrypted third cryptographic key. In some aspects, the TPM device 108 may provide the decrypted first cryptographic key and/or the decrypted third cryptographic key to the security application 104.

The security application 104 may utilize the first cryptographic key to decrypt the first factor authentication information. The security application 104 may utilize the first factor authentication information to determine the first factor. The security application 104 may also utilize the third cryptographic key to decrypt the metadata. Further, the security application 104 may utilize the communication information to communicate the metadata and/or the first factor to the network service provider. The network service provider 116 may authenticate the metadata and/or the first factor. Based at least in part on successful authentication of the metadata and/or the first factor, the network service provider 116 may prompt the user device 102 for communication of the second factor.

In this case, the security application 104 may transmit the second decryption request to decrypt the encrypted second cryptographic key based at least in part on utilizing the second master key. The second decryption request may include the second unique identifier in association with the encrypted second cryptographic key to indicate to the TPM device 108 that the encrypted second cryptographic key is to be decrypted based at least in part on utilizing the second master key that is associated with (e.g., identified by) the second unique identifier.

The second decryption request may also include and/or indicate a result of the security application 104 verifying and authenticating biometric information. In an example, the security application 104 may receive and verify/authenticate biometric information in real time (e.g., while transmitting the second decryption request), as discussed elsewhere herein. When the received biometric information matches the stored authentic biometric information, the security application 104 may determine that the received biometric information belongs to the authorized user and may select to transmit the second decryption request. Further, the second decryption request may include and/or indicate the result of the successful verification and/or authentication.

Based at least in part on receiving the second decryption request, the TPM device 108 may determine, from the included and/or indicated result of the successful verification and/or authentication, that the received biometric information matches the stored authentic biometric information. Further, the TPM device 108 may determine that the encrypted second cryptographic key is to be decrypted using the second master key associated with the second unique identifier, as indicated by the second decryption request. As a result, the TPM device 108 may decrypt the encrypted second cryptographic key based at least in part on utilizing the second master key.

When the second master key includes a second symmetric master key, the TPM device 108 may utilize the second symmetric master key to decrypt the encrypted second cryptographic key. When the second master key includes a second master key pair, the TPM device 108 may utilize the second master private key to decrypt the encrypted second cryptographic key. In some aspects, the TPM device 108 may provide the decrypted second cryptographic key to the security application 104.

The security application 104 may utilize the second cryptographic key to decrypt the second factor authentication information. The security application 104 may utilize the second factor authentication information to determine the second factor. Further, the security application 104 may utilize the communication information to communicate the second factor to the network service provider 116. The network service provider 116 may authenticate the second factor. Based at least in part on successful authentication of the second factor, the network service provider 116 may provide the user device 102 with the network services.

In this way, the security application and/or the security infrastructure may enable utilization of the biometric unit, the TPM device, and/or a particular arrangement of keys to enable secure authentication of a user device by a network service provider. Based at least in part on utilization of the biometric unit and/or the TPM device during authentication, the security application may enable identity authentication (e.g., authenticate identity of an authorized user during authentication), thereby securing the authentication process and preventing private information from becoming compromised. As a result, the security application may enable efficient utilization of resources (e.g., management resources, network resources, financial resources, processing resources, memory resources, power consumption resources, battery life, or the like) by the user device and/or the network service provider. Additionally, the security application may reduce inconvenience associated with an authorized user switching between applications and/or between devices.

As indicated above, FIG. 2 is provided as an example. Other examples may differ from what is described with regard to FIG. 2.

FIG. 3 is an illustration of an example process 300 associated with a secure authentication system, according to various aspects of the present disclosure. In some aspects, the process 300 may be performed by a memory and/or a processor/controller (e.g., processor 620) associated with a user device (e.g., user device 102) executing a security application. As shown by reference numeral 310, process 300 may include transmitting, by a processor based at least in part on verifying first biometric information, a first decryption request including an encrypted first cryptographic key in association with a first identifier to indicate that the encrypted first cryptographic key is to be decrypted based at least in part on utilizing a first master key identified by the first identifier. For instance, the user device may utilize an associated communication interface (e.g., communication interface 670) with the associated processor/controller to transmit, based at least in part on verifying first biometric information, a first decryption request including an encrypted first cryptographic key in association with a first identifier to indicate that the encrypted first cryptographic key is to be decrypted based at least in part on utilizing a first master key identified by the first identifier, as discussed elsewhere herein.

As shown by reference numeral 320, process 300 may include decrypting, by the processor based at least in part on receiving a decrypted first cryptographic key, first factor authentication information to enable determination of a first factor. For instance, the user device may utilize the associated processor/controller to decrypt, based at least in part on receiving a decrypted first cryptographic key, first factor authentication information to enable determination of a first factor, as discussed elsewhere herein.

As shown by reference numeral 330, process 300 may include transmitting, by the processor, the first factor for authentication of the first factor. For instance, the user device may utilize the associated communication interface and processor/controller to transmit the first factor for authentication of the first factor, as discussed elsewhere herein.

As shown by reference numeral 340, process 300 may include transmitting, by the processor based at least in part on successful authentication of the first factor and on verifying second biometric information, a second decryption request including an encrypted second cryptographic key in association with a second identifier to indicate that the encrypted second cryptographic key is to be decrypted based at least in part on utilizing a second master key identified by the second identifier. For instance, the user device may utilize the associated communication interface and processor/controller to transmit, based at least in part on successful authentication of the first factor and on verifying second biometric information, a second decryption request including an encrypted second cryptographic key in association with a second identifier to indicate that the encrypted second cryptographic key is to be decrypted based at least in part on utilizing a second master key identified by the second identifier, as discussed elsewhere herein.

As shown by reference numeral 350, process 300 may include decrypting, by the processor based at least in part on receiving a decrypted second cryptographic key, second factor authentication information to enable determination of a second factor. For instance, the user device may utilize the associated processor/controller to decrypt, based at least in part on receiving a decrypted second cryptographic key, second factor authentication information to enable determination of a second factor, as discussed elsewhere herein.

As shown by reference numeral 360, process 300 may include transmitting, by the processor, the second factor for authentication of the second factor. For instance, the user device may utilize the associated communication interface and processor/controller to transmit the second factor for authentication of the second factor, as discussed elsewhere herein.

Process 300 may include additional aspects, such as any single aspect or any combination of aspects described below and/or in connection with one or more other processes described elsewhere herein.

In a first aspect, in process 300, the second factor is variable based at least in part on a time reference.

In a second aspect, alone or in combination with the first aspect, in process 300, transmitting the first decryption request includes indicating successful verification of the first biometric information, and transmitting the second decryption request includes indicating successful verification of the second biometric information.

In a third aspect, alone or in combination with the first through second aspects, in process 300, verifying the first biometric information includes comparing the first biometric with stored authentic biometric information, and verifying the second biometric information includes comparing the second biometric with the stored authentic biometric information.

In a fourth aspect, alone or in combination with the first through third aspects, in process 300, verifying the first biometric information includes causing a biometric unit to receive the first biometric information, and verifying the second biometric information includes causing the biometric unit to receive the second biometric information.

In a fifth aspect, alone or in combination with the first through fourth aspects, in process 300, transmitting the first decryption request includes transmitting the first decryption request based at least in part on detecting access to a network service by a local application.

In a sixth aspect, alone or in combination with the first through fifth aspects, in process 300, the first master key includes a first symmetric master key to be utilized for decrypting the encrypted first cryptographic key, or the first master key includes a first master public key and a first master private key, the first master private key to be utilized for decrypting the encrypted first cryptographic key.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with a secure authentication system, according to various aspects of the present disclosure. In some aspects, the process 400 may be performed by a memory and/or a processor/controller (e.g., processor 620) associated with a user device (e.g., user device 102) executing a security application. As shown by reference numeral 410, process 400 may include encrypting, by a processor associated with a user device, authentication information associated with authenticating the user device with a service provider, the authentication information including first factor authentication information for determining a first factor and second factor authentication information for determining a second factor. For instance, the user device may utilize the associated memory and processor to encrypt authentication information associated with authenticating the user device with a service provider, the authentication information including first factor authentication information for determining a first factor and second factor authentication information for determining a second factor, as discussed elsewhere herein.

As shown by reference numeral 420, process 400 may include detecting, by the processor, access to a service to be provided by the service provider. For instance, the user device may utilize the associated memory and processor to detect access to a service to be provided by the service provider, as discussed elsewhere herein.

As shown by reference numeral 430, process 400 may include determining, by the processor based at least in part on detecting the access, the first factor based at least in part on decrypting the first factor authentication information and the second factor based at least in part on decrypting the second factor authentication information. For instance, the user device may utilize the associated memory and processor to determine, based at least in part on detecting the access, the first factor based at least in part on decrypting the first factor authentication information and the second factor based at least in part on decrypting the second factor authentication information, as discussed elsewhere herein.

As shown by reference numeral 440, process 400 may include enabling, by the processor, authentication of the user device with the service provider based at least in part on utilizing the first factor and the second factor. For instance, the user device may utilize the associated memory and processor to enable authentication of the user device with the service provider based at least in part on utilizing the first factor and the second factor, as discussed elsewhere herein.

Process 400 may include additional aspects, such as any single aspect or any combination of aspects described below and/or in connection with one or more other processes described elsewhere herein.

In a first aspect, in process 400, encrypting the authentication information includes encrypting the first factor authentication information by utilizing a first cryptographic key and encrypting the second factor authentication information by utilizing a second cryptographic key, different from the first cryptographic key.

In a second aspect, alone or in combination with the first aspect, in process 400, detecting access to the service includes detecting transmission of a request for the service to a network address associated with the service provider.

In a third aspect, alone or in combination with the first through second aspects, in process 400, determining the second factor includes determining the second factor based at least in part on utilizing decrypted second factor authentication information in association with a security algorithm.

In a fourth aspect, alone or in combination with the first through third aspects, in process 400, decrypting the first factor authentication information includes verifying first biometric information and decrypting the second factor authentication information includes verifying second biometric information.

In a fifth aspect, alone or in combination with the first through fourth aspects, in process 400, enabling authentication of the user device includes transmitting the first factor and the second factor to a network address associated with the service provider.

In a sixth aspect, alone or in combination with the first through fifth aspects, in process 400, the second factor is variable based at least in part on a time reference.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with a secure authentication system, according to various aspects of the present disclosure. In some aspects, the process 500 may be performed by a memory and/or a processor/controller (e.g., processor 620) associated with an infrastructure device (e.g., processing unit 110) configuring a security application. As shown by reference numeral 510, process 500 may include configuring, by an infrastructure device, a user device to encrypt authentication information associated with authenticating the user device with a service provider, the authentication information including first factor authentication information for determining a first factor and second factor authentication information for determining a second factor. For instance, the infrastructure device may utilize the associated processor/controller to configure a user device to encrypt authentication information associated with authenticating the user device with a service provider, the authentication information including first factor authentication information for determining a first factor and second factor authentication information for determining a second factor, as discussed elsewhere herein.

As shown by reference numeral 520, process 500 may include configuring, by the infrastructure device, the user device to detect access to a service to be provided by the service provider. For instance, the infrastructure device may utilize the associated processor/controller to configure the user device to detect access to a service to be provided by the service provider, as discussed elsewhere herein.

As shown by reference numeral 530, process 500 may include configuring, by the infrastructure device, the user device to determine, based at least in part on detecting the access, the first factor based at least in part on decrypting the first factor authentication information and the second factor based at least in part on decrypting the second factor authentication information. For instance, the infrastructure device may utilize the associated processor/controller to configure the user device to determine, based at least in part on detecting the access, the first factor based at least in part on decrypting the first factor authentication information and the second factor based at least in part on decrypting the second factor authentication information, as discussed elsewhere herein.

As shown by reference numeral 540, process 500 may include configuring, by the infrastructure device, the user device to enable authentication of the user device with the service provider based at least in part on utilizing the first factor and the second factor. For instance, the infrastructure device may utilize the associated processor/controller to configure the user device to enable authentication of the user device with the service provider based at least in part on utilizing the first factor and the second factor, as discussed elsewhere herein.

Process 500 may include additional aspects, such as any single aspect or any combination of aspects described below and/or in connection with one or more other processes described elsewhere herein.

In a first aspect, in process 500, configuring the user device to encrypt the authentication information includes configuring the user device to encrypt the first factor authentication information by utilizing a first cryptographic key, and to encrypt the second factor authentication information by utilizing a second cryptographic key, different from the first cryptographic key.

In a second aspect, alone or in combination with the first aspect, in process 500, configuring the user device to detect access to the service includes configuring the user device to detect transmission of a request for the service to a network address associated with the service provider.

In a third aspect, alone or in combination with the first through second aspects, in process 500, configuring the user device to determine the second factor includes configuring the user device to determine the second factor based at least in part on utilizing decrypted second factor authentication information in association with a security algorithm.

In a fourth aspect, alone or in combination with the first through third aspects, in process 500, configuring the user device to determine the first factor includes configuring the user device to decrypt the first factor authentication information by verifying first biometric information, and configuring the user device to determine the second factor includes configuring the user device to decrypt the second factor authentication information by verifying second biometric information.

In a fifth aspect, alone or in combination with the first through fourth aspects, in process 500, configuring the user device to enable authentication of the user device includes configuring the user device to transmit the first factor and the second factor to a network address associated with the service provider.

In a sixth aspect, alone or in combination with the first through fifth aspects, in process 500, the second factor is variable based at least in part on a time reference.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600, according to various aspects of the present disclosure. In some aspects, the example devices 600 may form part of or implement the systems, environments, infrastructures, components, or the like described elsewhere herein and may be used to perform the example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   verifying, by a processor associated with a device, first biometric information;
   transmitting, byte processor to a trusted device located on the device and based at least in part on verifying the first biometric information, a first decryption request including an encrypted first cryptographic key in association with a first identifier to indicate that the encrypted first cryptographic key is to be decrypted by the trusted device based at least in part on utilizing a first master key identified by the first identifier;
   receiving, by the processor based at least in part on transmitting the first decryption request to the trusted device, a first cryptographic key that is obtained by the trusted device decrypting the encrypted first cryptographic key based at least in part on utilizing the first master key;
   decrypting, by the processor based at least in part on utilizing the first cryptographic key, first factor authentication information to enable determination of a first factor;
   transmitting, by the processor, the first factor for authentication of the first factor;
   verifying, by the processor based at least in part on successful authentication of the first factor, second biometric information;
   transmitting, by the processor to the trusted device and based at least in part on verifying the second biometric information, a second decryption request including an encrypted second cryptographic key in association with a second identifier to indicate that the encrypted second cryptographic key is to be decrypted by the trusted device based at least in part on utilizing a second master key identified by the second identifier;
   receiving, by the processor based at least in part on transmitting the second decryption request to the trusted device, a second cryptographic key that is obtained by the trusted device decrypting the encrypted second cryptographic key based at least in part on utilizing the second master key;
   decrypting, by the processor based at least in part on utilizing the second cryptographic key, second factor authentication information to enable determination of a second factor; and
   transmitting, by the processor, the second factor for authentication of the second factor to enable access to a service.

2. The method of claim 1, wherein the second factor is variable based at least in part on a time reference.

3. The method of claim 1, wherein
   transmitting the first decryption request includes indicating successful verification of the first biometric information, and
   transmitting the second decryption request includes indicating successful verification of the second biometric information.

4. The method of claim 1, wherein
verifying the first biometric information includes comparing the first biometric information with stored authentic biometric information, and
verifying the second biometric information includes comparing the second biometric information with the stored authentic biometric information.

5. The method of claim 1, wherein
verifying the first biometric information includes causing a biometric unit to receive the first biometric information, and
verifying the second biometric information includes causing the biometric unit to receive the second biometric information.

6. The method of claim 1, wherein the first master key or the second master key is inaccessible to the processor.

7. The method of claim 1, wherein
the first master key includes a first symmetric master key to be utilized for decrypting the encrypted first cryptographic key, or
the first master key includes a first master public key and a first master private key, the first master private key to be utilized for decrypting the encrypted first cryptographic key.

8. A user device, comprising:
a memory; and
a processor communicatively coupled to the memory, the memory and the processor being configured to:
verify first biometric information;
transmit, to a trusted device located on the user device and based at least in part on verifying the first biometric information, a first decryption request including an encrypted first cryptographic key in association with a first identifier to indicate that the encrypted first cryptographic key is to be decrypted by the trusted device based at least in part on utilizing a first master key identified by the first identifier;
receive, based at least in part on transmitting the first decryption request to the trusted device, a first cryptographic key that is obtained by the trusted device decrypting the encrypted first cryptographic key based at least in part on utilizing the first master key;
decrypt, based at least in part on utilizing the first cryptographic key, first factor authentication information to enable determination of a first factor;
transmit the first factor for authentication of the first factor;
verify, based at least in part on successful authentication of the first factor, second biometric information;
transmit, to the trusted device based at least in part on verifying the second biometric information, a second decryption request including an encrypted second cryptographic key in association with a second identifier to indicate that the encrypted second cryptographic key is to be decrypted by the trusted device based at least in part on utilizing a second master key identified by the second identifier;
receive, based at least in part on transmitting the second decryption request to the trusted device, a second cryptographic key that is obtained by the trusted device decrypting the encrypted second cryptographic key based at least in part on utilizing the second master key;
decrypt, by the processor based at least in part on utilizing the second cryptographic key, second factor authentication information to enable determination of a second factor; and
transmit the second factor for authentication of the second factor to enable access to a service.

9. The user device of claim 8, wherein the second factor is variable based at least in part on a time reference.

10. The user device of claim 8, wherein
to transmit the first decryption request, the memory and the processor are configured to indicate successful verification of the first biometric information, and
to transmit the second decryption request, the memory and the processor are configured to indicate successful verification of the second biometric information.

11. The user device of claim 8, wherein
to verify the first biometric information, the memory and the processor are configured to compare the first biometric information with stored authentic biometric information, and
to verify the second biometric information, the memory and the processor are configured to compare the second biometric information with the stored authentic biometric information.

12. The user device of claim 8, wherein
to verify the first biometric information, the memory and the processor are configured to cause a biometric unit to receive the first biometric information, and
to verify the second biometric information, the memory and the processor are configured to cause the biometric unit to receive the second biometric information.

13. The user device of claim 8, wherein the first master key or the second master key is inaccessible to the processor.

14. The user device of claim 8, wherein
the first master key includes a first symmetric master key to be utilized for decrypting the encrypted first cryptographic key, or
the first master key includes a first master public key and a first master private key, the first master private key to be utilized for decrypting the encrypted first cryptographic key.

15. A non-transitory computer-readable medium configured to store instructions, which when executed by a processor associated with a user device, configure the processor to:
verify first biometric information;
transmit, to a trusted device located on the user device and based at least in part on verifying the first biometric information, a first decryption request including an encrypted first cryptographic key in association with a first identifier to indicate that the encrypted first cryptographic key is to be decrypted by the trusted device based at least in part on utilizing a first master key identified by the first identifier;
receive, based at least in part on transmitting the first decryption request to the trusted device, a first cryptographic key that is obtained by the trusted device decrypting the encrypted first cryptographic key based at least in part on utilizing the first master key;
decrypt, based at least in part on utilizing the first cryptographic key, first factor authentication information to enable determination of a first factor;
transmit the first factor for authentication of the first factor;
verify, based at least in part on successful authentication of the first factor, second biometric information;
transmit, to the trusted device based at least in part on verifying the second biometric information, a second decryption request including an encrypted second cryptographic key in association with a second identifier to indicate that the encrypted second cryptographic key is to be decrypted by the trusted device based at least in part on utilizing a second master key identified by the second identifier;

receive, based at least in part on transmitting the second decryption request to the trusted device, a second cryptographic key that is obtained by the trusted device decrypting the encrypted second cryptographic key based at least in part on utilizing the second master key;

decrypt, by the processor based at least in part on utilizing the second cryptographic key, second factor authentication information to enable determination of a second factor; and transmit the second factor for authentication of the second factor to enable access to a service.

16. The non-transitory computer-readable medium of claim 15, wherein the second factor is variable based at least in part on a time reference.

17. The non-transitory computer-readable medium of claim 15, wherein to transmit the first decryption request, the processor is configured to indicate successful verification of the first biometric information, and to transmit the second decryption request, the processor is configured to indicate successful verification of the second biometric information.

18. The non-transitory computer-readable medium of claim 15, wherein to verify the first biometric information, the processor is configured to compare the first biometric information with stored authentic biometric information, and to verify the second biometric information, the processor is configured to compare the second biometric information with the stored authentic biometric information.

19. The non-transitory computer-readable medium of claim 15, wherein to verify the first biometric information, the processor is configured to cause a biometric unit to receive the first biometric information, and to verify the second biometric information, the processor is configured to cause the biometric unit to receive the second biometric information.

20. The non-transitory computer-readable medium of claim 15, wherein the first master key or the second master key is inaccessible to the processor.

* * * * *